United States Patent
Kim et al.

(10) Patent No.: US 7,859,989 B2
(45) Date of Patent: Dec. 28, 2010

(54) WIRELESS LAN AND USB BRIDGING APPARATUS FOR CONNECTING COMMUNICATION BETWEEN WIRELESS LOCAL AREA NETWORK AND WIRELESS USB NETWORK

(75) Inventors: Jong Won Kim, Daejeon (KR); Jae Doo Huh, Daejeon (KR); Kwang Roh Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 736 days.

(21) Appl. No.: 11/867,385

(22) Filed: Oct. 4, 2007

(65) Prior Publication Data
US 2008/0117886 A1 May 22, 2008

(30) Foreign Application Priority Data
Nov. 17, 2006 (KR) ............ 10-2006-0113954

(51) Int. Cl.
*H04J 11/00* (2006.01)
(52) U.S. Cl. .................................... 370/208
(58) Field of Classification Search ............ None
See application file for complete search history.

(56) References Cited

U.S. PATENT DOCUMENTS

| | | | |
|---|---|---|---|
| 2003/0081630 A1 | 5/2003 | Mowery et al. | |
| 2003/0212821 A1* | 11/2003 | Gillies et al. | 709/238 |
| 2007/0189217 A1* | 8/2007 | Wang et al. | 370/331 |
| 2008/0224869 A1* | 9/2008 | Kaplan | 340/572.1 |
| 2008/0232299 A1* | 9/2008 | Mosig | 370/328 |

FOREIGN PATENT DOCUMENTS

| | | |
|---|---|---|
| KR | 2001-0005140 | 1/2001 |
| KR | 2003-0050463 A | 6/2003 |
| KR | 1020040024485 | 3/2004 |
| KR | 1020040059393 | 7/2004 |
| KR | 2005-0063211 A | 6/2005 |
| KR | 1020060018539 | 3/2006 |
| KR | 2006-0118984 A | 11/2006 |
| KR | 10-0694298 B1 | 3/2007 |

OTHER PUBLICATIONS

Notice of Office Action issued from Korean Property Office mailed Jan. 18, 2008.

* cited by examiner

*Primary Examiner*—Raj K Jain
(74) *Attorney, Agent, or Firm*—Ladas & Parry LLP (57) ABSTRACT

A LAN/USB bridge apparatus is provided. The LAN/USB bridge apparatus includes a wireless LAN/USB signal processor and a controller. The wireless LAN/USB signal processor receives a wireless LAN signal transmitted from a wireless LAN access point performing a bridging function between a wired LAN and a wireless LAN, transforms the received wireless LAN signal a UWB (ultra wide band) signal, and transmits the UWB signal to at least one of wireless USB apparatuses. The wireless LAN/USB signal processor also receives a UWB signal transmitted from the wireless USB apparatuses, inverse-transforms the received UWB signal to the wireless LAN signal, and transmits the wireless LAN signal to the wireless LAN access point. The controller controls and manages operations of the LAN/USB signal processor.

17 Claims, 7 Drawing Sheets

WIRELESS LAN AND USB BRIDGING APPARATUS FOR CONNECTING COMMUNICATION BETWEEN WIRELESS LOCAL AREA NETWORK AND WIRELESS USB NETWORK

CLAIM OF PRIORITY

This application claims the benefit of Korean Patent Application No. 2006-113954 filed on Nov. 11, 2006 in the Korean Intellectual Property Office, the disclosure of which is incorporated herein by reference.

BACKGROUND OF THE INVENTION

1. Field of the Invention

The present invention relates to wireless data communication and, more particularly, to a bridge apparatus providing a communication interface between heterogeneous devices each using different wireless local area network (LAN) scheme to communicate with each others.

2. Description of the Related Art

In general, a bridge apparatus is used as a device for connecting the two communication networks of two wired LAN devices to communicate with each other in a local area network (LAN).

Recently, a wireless bridge apparatus for connecting two wireless LAN communication devices to communicate with each other in a wireless LAN (WLAN) was introduced. A wired/wireless LAN bridge apparatus was introduced for connecting a wireless LAN (WLAN) access point (AP) and wired LAN communication network devices in a LAN.

A conventional wired/wireless LAN bridge apparatus for connecting a wireless LAN access point and wired LAN communication devices has a problem of not providing mobility. Since the wired/wireless LAN bridge apparatus uses a wired LAN transmitter and receiver, the conventional wired/wireless LAN bridge apparatus also has a problem of a slow transmit rate. For example, the maximum wired LAN transmit rate is about 100 Mbps. Furthermore, the conventional wired/wireless LAN bridge apparatus cannot guarantee Quality of service (QoS) so the conventional wired/wireless LAN bridge apparatus cannot be used to provide real-time audio/video data service.

Recently, a wireless USB apparatus was introduced. The wireless USB apparatus allows wireless LAN communication to electronic devices having a universal serial bus (USB) ports, such as a computer. Such a wireless USB apparatus supports the mass amount of data transmission at a high data transmit rate in the wireless LAN communication.

Therefore, there is a demand of an apparatus for connecting a WLAN AP and wireless USB apparatus to communication with each others in a LAN wireless network environment.

SUMMARY OF THE INVENTION

The present invention has been made to solve the foregoing problems of the prior art and therefore an aspect of the present invention is to provide a bridge apparatus for providing the continuity and the mobility of communication between wireless apparatuses using different communication schemes.

Another aspect of the invention is to provide a bridge apparatus for connecting wireless apparatuses using different communication schemes to transmit the mass amount of audio/video data in real time with Quality of Service guaranteed therebetween.

Still another aspect of the invention to provide a bridge apparatus for connecting a wireless LAN access point and wireless USB apparatus to communicate with each others in a wireless LAN network environment.

According to an aspect of the invention, the invention provides a LAN (local area network)/USB (universal serial bus) bridge apparatus including: a wireless LAN/USB signal processor for receiving a wireless LAN signal transmitted from a wireless LAN access point performing a bridging function between a wired LAN and a wireless LAN, transforming the received wireless LAN signal into a UWB (ultra wide band) signal, transmitting the UWB signal to at least one of wireless USB apparatuses, and for receiving a UWB signal transmitted from the wireless USB apparatuses, inverse-transforming the received UWB signal to the wireless LAN signal, and transmitting the wireless LAN signal to the wireless LAN access point; and a controller for controlling and managing operations of the LAN/USB signal processor.

The wireless LAN/USB signal processor may include: a wireless LAN signal processor for transforming a wireless LAN signal received from the wireless LAN access point to wireless LAN link data; a frame buffer for receiving the wireless LAN link data from the wireless LAN signal processor, temporally storing the wireless LAN link data, transforming the stored wireless LAN link data to wireless USB link data, and for receiving the wireless USB link data, temporally storing the wireless USB link data, inverse-transforming the wireless USB link data to the wireless LAN link data, and outputting the wireless LAN link data to the wireless LAN signal processor; and a wireless UWB signal processor for transforming wireless USB link data outputted the frame buffer to a wireless UWB signal, transmitting the wireless UWB signal to the wireless USB apparatus, and for transforming the wireless UWB signal transmitted from the wireless USB apparatuses to the wireless USB link data, and outputting the wireless USB link data to the frame buffer.

The wireless LAN signal processor may include a wireless LAN antenna for transmitting and receiving the wireless LAN signal to/from the wireless LAN access point; a wireless LAN physical layer processor for transforming a wireless LAN signal received at the wireless LAN antenna to wireless LAN station MAC (medium access control) data, outputting the wireless LAN station MAC data, transforming the wireless LAN station MAC data to the wireless LAN signal, and outputting the wireless LAN signal to the wireless LAN antenna; and a wireless LAN station medium access controller for transforming wireless LAN station MAC data outputted from the wireless LAN physical layer processor to the wireless LAN link data, and outputting the wireless LAN link data to the frame buffer.

The wireless UWB signal processor may include: a wireless USB host medium access controller for transforming the wireless USB link data outputted from the frame buffer to wireless USB host MAC data, outputting the wireless USB host MAC data, transforming inputted wireless USB host MAC data to the wireless USB link data, and outputting the wireless USB link data to the frame buffer; a UWB physical layer processor for transforming the outputted wireless USB host MAC data to the wireless UWB signal, outputting the wireless UWB signal, transforming inputted wireless UWB signal to the wireless USB host MAC data, and outputting the wireless USB host MAC data to the wireless USB host medium access controller; and a UWB antenna for transmitting a wireless UWB signal outputted from the UWB physical layer processor to the wireless USB apparatus, receiving a wireless UWB signal from the wireless USB apparatus, and outputting the wireless UWB signal to the UWB physical layer processor.

The wireless USB host medium access controller may include: a transmitting/receiving memory for receiving wireless USB link transmission data from the frame buffer, receiving a control signal from the controller, temporally storing the received wireless USB link data, transforming the wireless USB link data to transmission memory data, and outputting the transmission memory data, and for receiving input receiving memory data, temporally storing the receiving memory data, transforming the receiving memory data to the wireless USB link receiving data, outputting the wireless USB link receiving data to the frame buffer, and outputting a control signal included in the receiving memory data to the frame buffer; a transmitting/receiving queue for receiving transmission memory data from the transmission memory, temporally storing the received transmission memory data, and transforming the stored transmission memory data to transmission queue data based on a transmission queue control signal, and for receiving input receiving queue data, temporally storing the received receiving queue data, transforming the receiving queue data to the receiving memory data based on a receiving queue control signal, and outputting the receiving memory data to the transmitting/receiving memory; a protocol controller for receiving transmission queue data from the transmitting/receiving queue, receiving a control signal from the controller, transforming the received transmission queue data to protocol control transmission data, outputting the protocol control transmission data, transforming inputted protocol control receiving data to the receiving queue data, and outputting the receiving queue data to the transmitting/receiving queue; and a medium access control transmitting/receiving unit for receiving protocol control transmission data from the protocol controller, transforming the protocol control transmission data to the wireless USB host MAC data, outputting the wireless USB host MAC data to the UWB physical layer processor, transforming wireless USB host MAC data received from the UWB physical layer processor to the protocol control receiving data, and outputting the protocol control receiving data to the protocol controller.

The UWB physical layer processor may include: a UWB physical layer transmission processor for transforming wireless USB host MAC data outputted from the wireless USB host medium access controller to the wireless UWB signal based on a control signal inputted from the controller, and outputting the wireless UWB signal to the UWB antenna; and a UWB physical layer receiving processor for extracting a control signal required for operation of the UWB physical layer transmission processor from a wireless UWB signal inputted from the UWB antenna, outputting the extracted control signal to the wireless USB host medium access controller, transforming the wireless UWB signal to the wireless USB host MAC data, and outputting the wireless USB host MAC data to the wireless USB host medium access controller.

The USB physical layer transmission processor may include: a PLCP(Physical Layer Convergence Procedure) processor for transforming wireless USB host MAC data received from the wireless USB host medium access controller to PLCP(Physical Layer Convergence Procedure) processed data; a scrambler for transforming the PLCP processed data to scrambled data; a RS (Reed Solomon) encoder for transforming the scrambled data to RS encoded data; a convolutional encoder for transforming the RS encoded data to convolutional encoded data; a puncturer for transforming the convolutional encoded data to punctured data; an interleaver for transforming the punctured data to interleaved data by rearranging an order of symbol sequence and data sequence in a predetermined unit; a modulator for modulating the interleaved data through one of QPSK(Quadrature Phase Shift Keying) modulation scheme and DCM(Dual Carrier Modulation) modulation scheme; a serial/parallel converter for converting the modulated serial data to parallel data; an IFFT(Inverse Fast Fourier Transform) unit for performing IFFT (Inverse Fast Fourier Transform) on the parallel data; a DAC (digital to analog converter) for transforming the digital IFFT-transformed data to analog signal; and a RF transmitter for transforming the analog signal to a 'WiMedia' UWB signal, and outputting the 'WiMedia' UWB signal to a UWB antenna.

The UWB physical layer receiving processor may include: a RF receiver for RF-modulating a wireless UWB signal received from the UWB antenna to a baseband analog signal; an ADC (analog digital converter) for transforming the RF modulated UWB analog signal to digital data; a FFT unit for transforming the digital signal to FFT data through FFT(Fast Fourier Transform); a parallel/serial converter for transforming the FFT data to serial data through parallel-to-serial conversion; an equalizer for transforming the serial data to equalized data by performing an equalizing function that compensates signal distortion according to a transmission channel; a demodulator for demodulating the equalized data through one of QPSK demodulation scheme or DCM demodulation scheme; a de-interleaver for performing a bit de-interleaving function on the demodulated data to correct burst error of the demodulated data; a de-puncturer for recovering a predetermined portion of regularly cancelled data by performing a de-puncturing function on the de-interleaved data; a viterbi decoder for performing a viterbi decoding function on the de-punctured data to correct random error; a RS decoder for performing a RS decoding function on the viterbi-decoded data to correct burst error; and a descrambler for transforming the RS decoded data to the wireless USB host MAC data by performing a descrambling function generating original data from random code sequence generated by the scrambler.

The modulator may perform the QPSK modulation scheme at a transmit rate of about 53.3 to 200 Mbps or performs the DCM modulation scheme at a transmit rate of about 320 to 480 Mbps.

The wireless UWB signal may have a transmit rate of about 53.3 to 480 Mbps at about 3.1 GHz to 10.6 GHz.

The wireless LAN station MAC data may have a wireless LAN station MAC data frame, and the wireless LAN station MAC data includes a wireless LAN MAC header, wireless LAN link data, and wireless LAN MAC trailer.

The wireless USB host MAC data may have a wireless USB host MAC data frame format, and the wireless USB host MAC data includes a wireless USB MAC header, a wireless USB link data, and a wireless USB MAC trailer.

The PLCP processor data may have WiMedia UWB PHY PPDU(PHY Protocol Data Unit) frame format, and the PLCP processor data includes a PLCP preamble, a PLCP header, and a PSDU(presentation service data unit).

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Certain embodiments of the present invention will now be described in detail with reference to the accompanying drawings.

The present invention relates to a wireless LAN/USB bridge apparatus and method for providing a function of connecting a wireless local area network (WLAN) access point (AP) and universal service bus (USB) apparatus to communicate with each others, providing a wireless LAN station function and a wireless UST host function, providing a function of converting wireless LAN signals to a WiMedia ultra wide band (UWB) signal to guarantee Quality of service (QoS), and providing a function of converting the WiMedia UWB signal to a wireless LAN signal. The present invention also relates to a wireless LAN/USB bridge apparatus providing mobility by connecting a WLAN AP with wireless USB apparatuses, supporting high speed wireless USB transmit rate, for example, 53.5 to 480 Mbps, using a WiMedia UWB transceiver, transmitting audio/video data in real time by guaranteeing QoS using 'WiMedia' UWB medium access control (MAC), and providing a wireless LAN station function and a wireless USB host function, and a method thereof.

Figure 1:
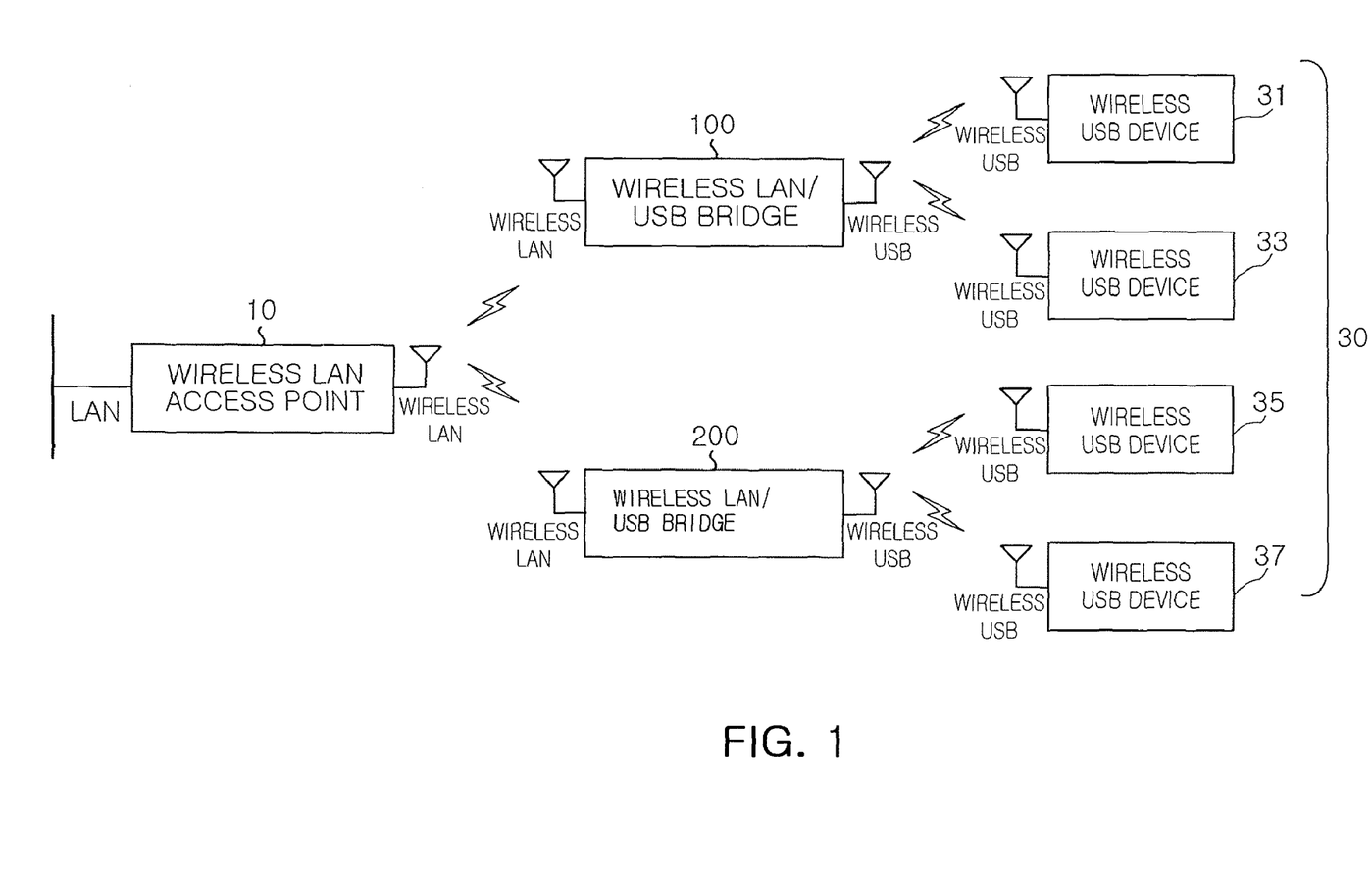
FIG. 1 is a block diagram illustrating a network structure of a wireless LAN/USB bridge apparatus for connecting a WLAN AP and wireless USB apparatuses to communicate with each others according to an embodiment of the present invention.

FIG. 1 is a block diagram illustrating a network structure of a wireless LAN/USB bridge apparatus for connecting a WLAN AP and wireless USB apparatuses to communicate with each others according to an embodiment of the present invention.

Referring to FIG. 1, a wireless local area network (WLAN) access point (AP) 10 performing a bridging function between a wired LAN and a wireless LAN. Herein, the WLAN AP 10 performs a function of forming a wireless local area network (WLAN).

The wireless LAN/USB bridge apparatuses 100 and 200 connect the WLAN access point 10 and wireless USB apparatuses 30 to communication with each others through a wireless LAN. Herein, the wireless LAN/USB bridge apparatuses 100 and 200 perform a wireless LAN station function for the WLAN AP 10 and a wireless USB host function for the wireless USB apparatuses 30. The wireless LAN/USB bridge apparatuses 100 and 200 also perform a function of transforming a wireless LAN signal to a 'WiMedia' USB signal that guarantees Quality of Service (QoS), and provides a function of inverse-transforming the 'WiMedia' UWB signal to the wireless LAN signal.

The wireless USB apparatuses 30 are connected to the wireless LAN/USB bridge apparatuses 100 and 200 through the WiMedia wireless UWB signal, and transmit/receive wireless USB data. The wireless USB apparatuses 30 perform a function of transmitting a control signal, a function of transmitting interrupt signal, a function of bulk transmission, and a function of Isochronous transmission.

Figure 2:
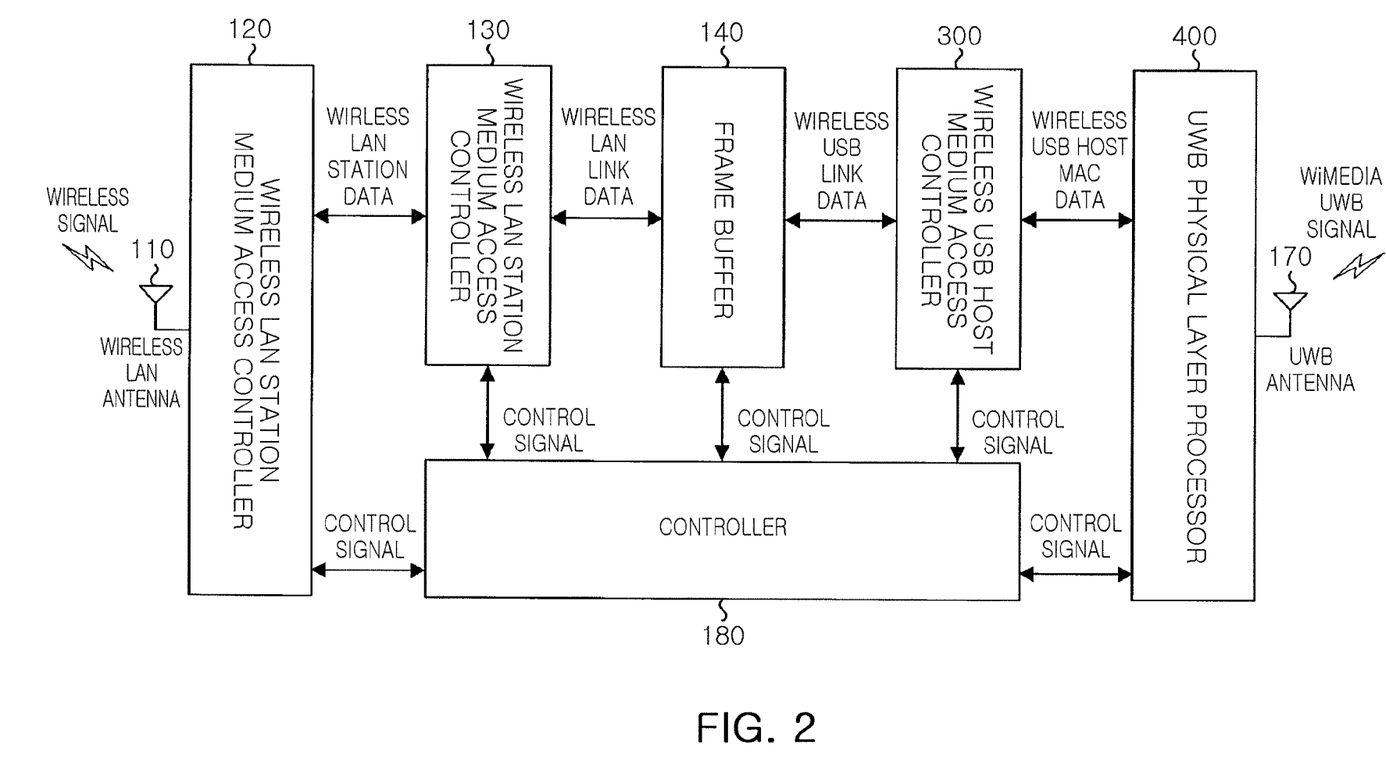
FIG. 2 is a block diagram illustrating wireless LAN/USB bridge apparatuses according to an embodiment of the present invention.

FIG. 2 is a block diagram illustrating wireless LAN/USB bridge apparatuses of FIG. 1. Since the wireless LAN/USB bridge apparatuses 100 and 200 have the same structure, the structure of one of the wireless LAN/USB bridge apparatuses 100 and 200 will be described.

Referring to FIG. 2, the wireless LAN/USB bridge apparatus 100 includes a wireless LAN antenna 100, a wireless LAN physical layer processor 120, a wireless LAN station medium access controller 130, a frame buffer 140, a wireless USB host medium access controller 300, a UWB physical layer processor 400, a UWB antenna 170, and a controller 180.

The wireless LAN antenna 100 transmits and receives a wireless LAN signal to/from the WLAN AP 10.

The wireless LAN physical layer processor 120 transforms a wireless LAN signal received through the wireless LAN antenna 100 to a wireless LAN station MAC data in a format of a wireless LAN station MAC data frame. The wireless LAN physical layer processor 120 transfers the wireless LAN station MAC data to the wireless LAN station medium access controller 130. Herein, the wireless LAN station MAC data in a format of the wireless LAN station MAC data format is shown in FIG. 5.

The wireless LAN physical layer processor 120 receives the wireless LAN station MAC data in a format of the wireless LAN station MAC data frame from the wireless LAN station medium access controller 130. The wireless LAN physical layer processor 120 receives a control signal for operating the wireless LAN physical layer processor 120 from the controller 180. Accordingly, the wireless LAN physical layer processor 120 inverse-transforms the wireless LAN station MAC data received from the wireless LAN station medium access controller 130 to a wireless LAN signal and transfers the wireless LAN signal to the wireless LAN antenna 110.

Figure 5:
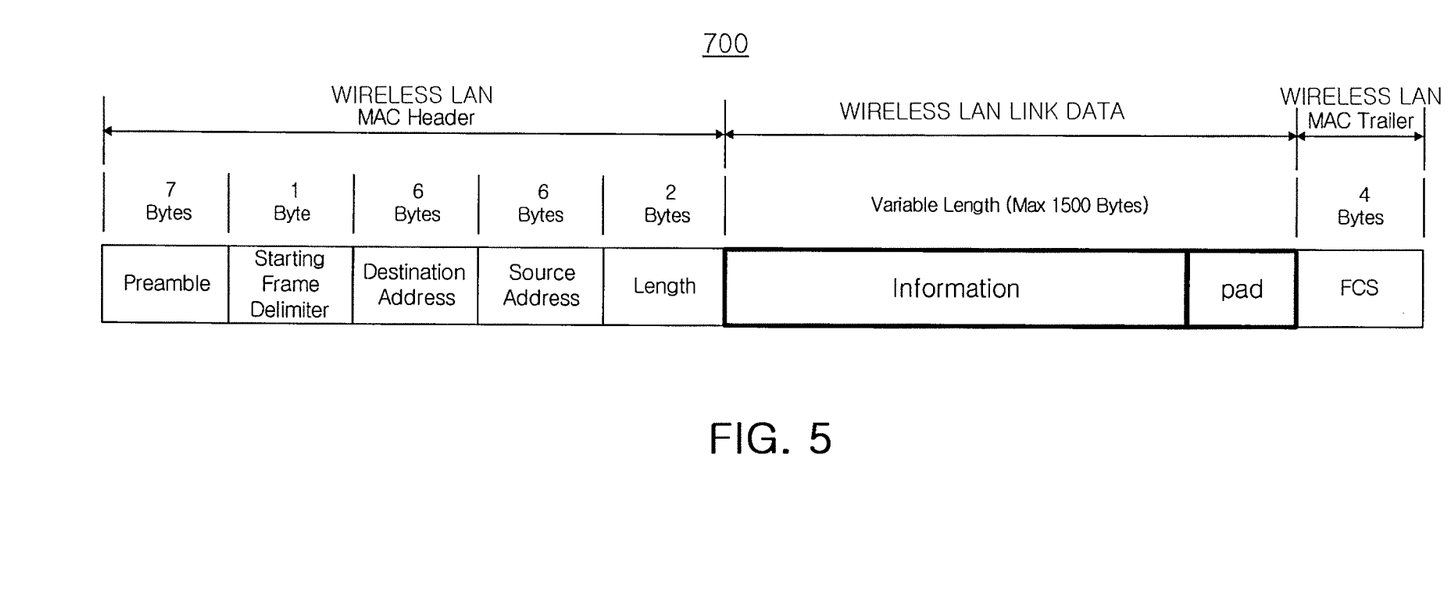
FIG. 5 is a diagram illustrating a wireless LAN station MAC data format generated by the wireless LAN physical layer processor 120 shown in FIG. 2.

The wireless LAN station medium access controller 130 receives wireless LAN station MAC data in the format of wireless LAN station MAC data frame shown in FIG. 5 from the wireless LAN physical layer processor 120. The wireless LAN station medium access controller 130 removes a WLAN MAC header and a WLAN MAC trailer from the received wireless LAN station MAC data. Accordingly, the wireless LAN station medium access controller 130 transfers a wireless LAN link data with the WLAN header and the WLAN MAC trailer removed to the frame buffer 140.

The wireless LAN station medium access controller 130 receives wireless LAN link data from the frame buffer 140 and a control signal for operating the wireless LAN station medium controller 130 from the controller 180. The wireless LAN station medium access controller 130 inverse-transforms the received wireless LAN link data to wireless LAN station MAC data in a format of wireless LAN station MAC data frame shown in FIG. 5. The wireless LAN station medium access controller 130 performs a wireless LAN station medium access control (MAC) function for the wireless LAN physical layer processor 120.

The frame buffer 140 receives wireless LAN link data from the wireless LAN station medium access controller 130 and receives a control signal for the frame buffer 140 from the controller 180. The frame buffer 140 temporally stores the received wireless LAN link data, transforms the received wireless LAN link data to wireless USB link data, and transfers the wireless USB link data to the wireless USB host medium access controller 300.

The frame buffer 140 receives wireless USB link data from the wireless USB host medium access controller 300 and receives a control signal for the frame buffer 140 from the controller 300. The frame buffer 140 temporally stores the received wireless USB link data, inverse-transforms the wireless USB link data, and transfers it to the wireless LAN station medium access controller 130.

The wireless USB host medium access (MAC) unit 300 receives wireless USB link data from the frame buffer 140, and receives control signals for operating the wireless USB host medium access controller 300. The wireless USB host medium access controller 300 transforms the wireless USB link data received from the frame buffer 140 to wireless USB host MAC data in a format of wireless USB host MAC data frame shown in FIG. 6, and transfers the wireless USB host MAC data to the UWB physical layer processor 400.

Figure 6:
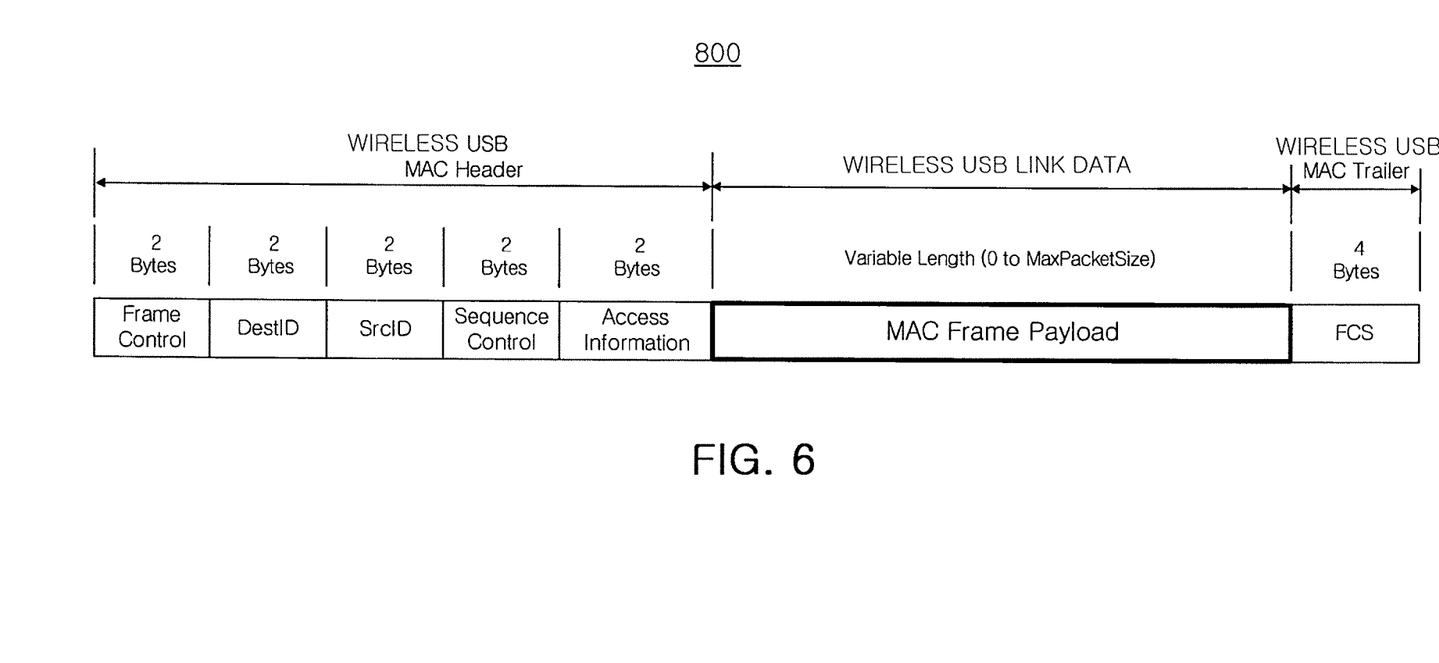
FIG. 6 is a diagram illustrating a wireless USB host MAC data format transformed by the wireless USB host medium access controller 300 of FIG. 2.

The wireless USB host medium access controller 300 receives wireless USB host MAC data in a format of wireless USB host MAC data frame shown in FIG. 6 from the UWB physical layer processor 400, removes a wireless USB MAC header and a wireless USB MAC trailer therefrom, and inverse-transforms it to the wireless USB link data. The wireless USB host medium access controller 300 performs a function of transferring the inverse-transformed wireless USB link data to the frame buffer 140, and performs a wireless USB host MAC function for the wireless USB link data.

The UWB physical layer processor 400 is an ultra wide band physical layer processor driven based on 'WiMedia'. Such a UWB physical layer processor 140 receives wireless USB host MAC data of wireless USB host MAC data frame shown in FIG. 6. The UWB physical layer processor 400 receives control signals for operating the UWB physical layer processor 400 from the controller 180. The UWB physical layer processor 400 transforms the received wireless USB host MAC data to a 'WiMedia' UWB signal that supports a transmit rate of about 53.3 to 480 Mbps in about 3.1 to 10.6 GHz, and transfers the UWB signal to the UWB antenna 170.

The UWB physical layer processor 400 receives the 'WiMedia' UWB signal supporting the transmit rate of about 53.3 to 480 Mbps at about 3.1 to 10.6 GHz of the wireless USB apparatuses 30 from the UWB antenna 170. Then, the UWB physical layer processor 400 inverse-transforms the 'WiMedia' UWB signal to the wireless USB host MAC data in the wireless USB host MAC data frame format shown in FIG. 6 and transforms the wireless USB host MAC data to the wireless USB host medium access controller 300.

The UWB antenna 170 performs a function of transmitting and receiving a WiMedia UWB signal of about 3.1 to 10.6 GHz.

The controller 180 controls and manages the wireless LAN physical layer processor 120 through a control signal, and controls and manages the frame buffer 140 using a control signal. The controller 180 controls and manages the wireless USB host medium access controller 300 through a control signal, and controls and manages the wireless USB host medium access controller 300 using the control signal.

Figure 3:
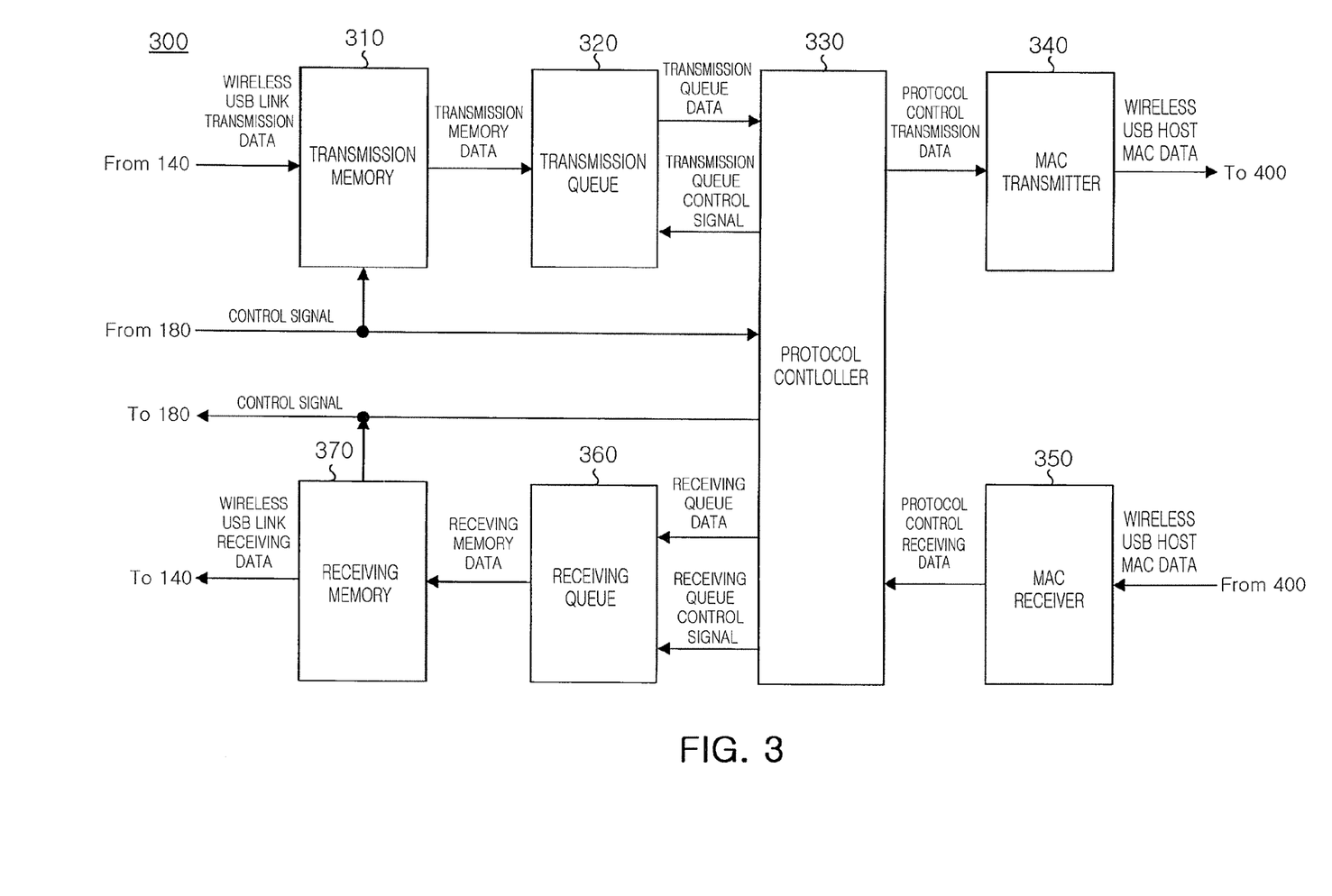
FIG. 3 is a block diagram illustrating a wireless USB host medium access controller 300 according to an embodiment of the present invention.

FIG. 3 is a block diagram illustrating a wireless USB host medium access controller 300 shown in FIG. 2.

Referring to FIG. 3, the wireless USB host medium access controller 300 includes a transmission memory 310, a transmission queue 320, a protocol controller 330, a medium access control (MAC) transmitter 340, a medium access control (MAC) receiver 350, a receiving queue 360, and a receiving memory 370.

The transmission memory 310 receives wireless USB link transmission data, which is a MAC frame payload shown in FIG. 6, from the frame buffer 140, and receives a control signal for operating the wireless USB host medium access controller 300, which is a wireless USB MAC header. The transmission memory 310 temporally stores the received wireless USB link data, transforms the wireless USB link data to 32-bit transmission memory data by combining the MAC frame payload and the wireless USB MAC header, and transfers the transmission memory data to the transmission queue 320.

The transmission queue 320 receives the 32 bit transmission memory data from the transmission memory 310 and temporally stores the received data. Then, the transmission queue 320 transforms the received data to 32-bit transmission queue data in response to a transmission queue control signal from the protocol controller 330, and transfers the transmission queue data to the protocol controller 330.

The protocol controller 330 receives 32-bit transmission queue data from the transmission queue 320, receives control signals for operating the wireless USB host medium access controller 330 from the controller 180, transforms the 32-bit transmission queue data to a 8-bit protocol controller transmission data, and transfers the protocol controller transmission data to the medium access control transmitter 340. The protocol controller 330 also receives 8-bit protocol controller receiving data from the MAC receiver 350, transforms it to 32-bit receiving queue data, and transfers the receiving queen data with a queue control signal to the receiving queue 360.

The protocol controller 330 transforms state data included in the protocol controller receiving data to a control signal of the wireless USB host medium access controller 300 and transfers the control signal to the controller 180. The protocol controller 330 performs a wireless USB host medium access control function.

The MAC transmitter 340 receives 8-bit protocol control transmission data from the protocol controller 330 and generates a MAC trailer of 4-byte frame check sequence (FCS). The MAC transmitter 340 transforms the protocol controller transmission data to wireless USB host MAC data in a form of wireless USB host MAC data frame shown in FIG. 6 and transfers the wireless USB host MAC data to the UWB physical layer processor 400.

The MAC receiver 350 receives the wireless USB host Mac data in a form of the wireless USB host MAC data frame shown in FIG. 6. The MAC receiver 350 obtains a frame address from the received wireless USB host MAC data and detects overlapped frames. Also, the MAC receiver 350 performs a FCS detecting function from the received wireless USB host MAC data, removes the MAC trailer, transforms to 8-bit protocol controller receiving data, and transfers the 8-bit protocol controller receiving data to the protocol controller 330.

The receiving queue 360 receives the 32-bit receiving queue data from the protocol controller 330, temporally stores it, transforms it to 32-bit receiving memory data according to a receiving queue control signal from the protocol controller 330, and transfers the receiving memory data to the receiving memory 370.

The receiving memory 370 receives 32-bit receiving memory data from the receiving queue 360, temporally stores the received receiving memory data, and separates it to MAC frame payload and a wireless USB MAC header. Herein, the MAC frame payload is transformed to wireless USB link receiving data, and the wireless USB link receiving data is transferred to the frame buffer 140.

Figure 4:
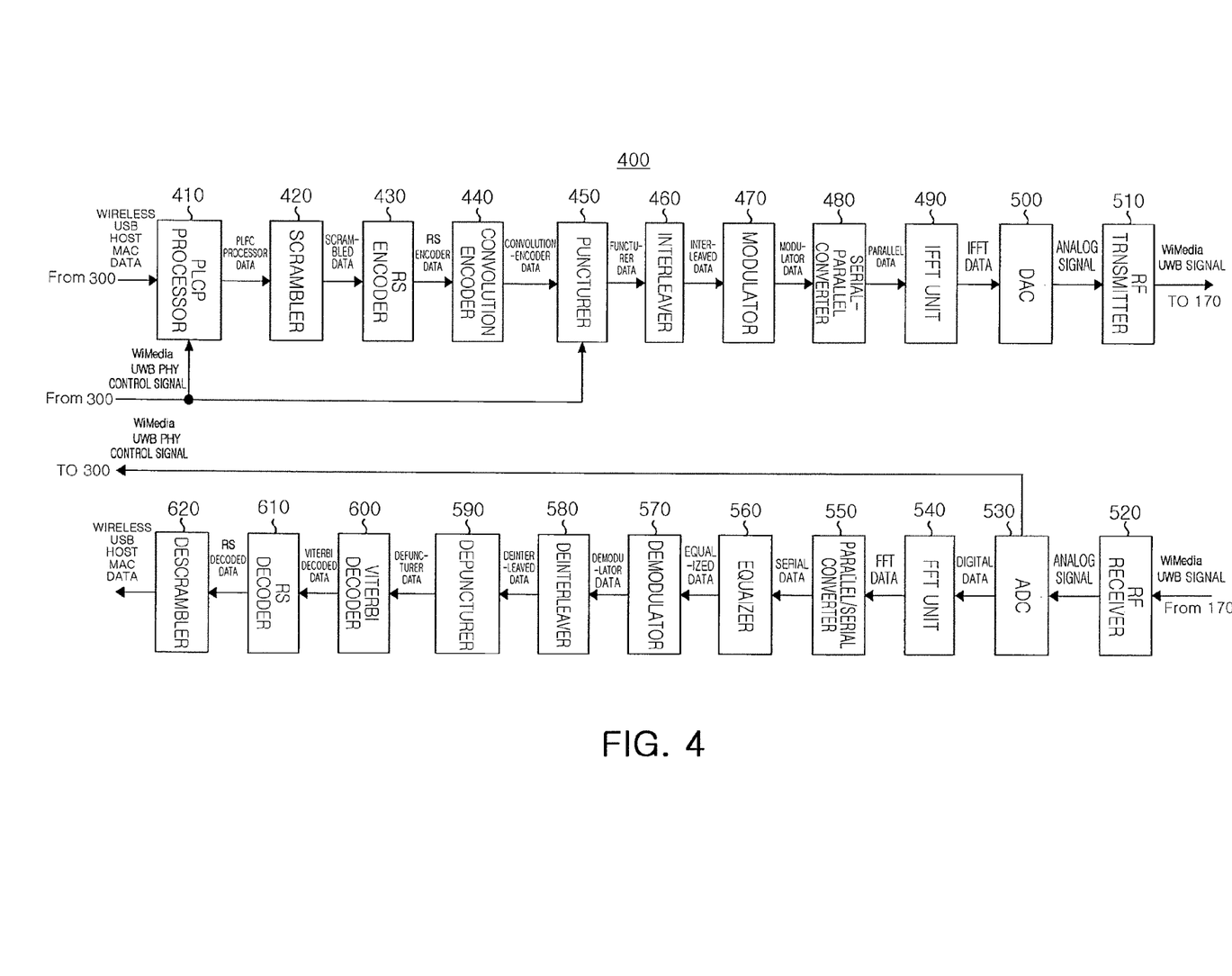
FIG. 4 is a block diagram illustrating a UWB physical layer processor 400 of FIG. 2.

FIG. 4 is a block diagram illustrating a UWB physical layer processor 400 of FIG. 2 according to an embodiment of the present invention.

Referring to FIG. 4, the physical layer convergence procedure (PLCP) processor 410 receives wireless USB host MAC data in a format of wireless USB host MAC data frame shown in FIG. 6. Also, the PLCP processor 410 receives a control signal for the UWB physical layer processor 400 from the controller 180. The PLCP processor 410 also receives a control signal for operating the UWB physical layer processor 400 from the controller 180. The PLCP processor 410 transforms the received wireless USB host data to PLCP processor data in a format of WiMedia UWB PHY PPDU (PHY protocol data unit) shown in FIG. 7, and transfers the PLCP processed data to a scrambler 420.

The scrambler 420 receives the PLCP processed data from the PLCP processor 410, transforms the PLCP processed data to a random code sequence, and transfers the random code sequence to the Reed Solomon (RS) encoder 43.

The RS encoder 430 receives the scrambled data from the scrambler 420 and performs a RS encoding function in order to correct burst error generated by temporal noise. Also, the RS encoder 430 transfers the RS encoded data to a convolutional encoder 440.

The convolutional encoder 440 receives the RS encoded data from the RS encoder 430, performs a convolution encoding function to correct random error, and transfers the convolutional encoded data to the puncturer 450.

The puncturer 450 receives the convolutional encoded data from the convolutional encoder 440, and receives control signals of the UWB physical layer processor 400 corresponding to a transmit rate data. The puncturer 450 performs a puncturing function for improving a coding rate by regularly canceling a predetermined portion of the convolutional encoded data at a predetermined transmit rate, and transfers the punctured data to the interleaver 460.

The interleaver 460 receives the punctured data from the puncturer 450, performs a bit-interleaving function of rearranging the order of symbol sequence and data sequence in a predetermined unit to correct the burst error generated by temporal noise, and transfers the interleaved data to a modulator 470.

The modulator 470 receives the interleaved data from the interleaver 460, performs Quadrature Phase Shift Keying (QPSK) modulation scheme if a transmit rate is about 53.3 to 200 Mbps, or performs Dual Carrier Modulation (DCM) scheme if a transmit rate is about 320 to 480 Mbps. The modulator 470 transfers the modulated data to the serial/parallel converter 480.

The serial/parallel converter 480 receives the modulated data from the modulator 470, transforms the serial data to parallel data, and transfers the parallel data to an inverse fast fourier transform (IFFT) unit 490.

The IFFT unit 490 receives the parallel data from the serial/parallel converter 480, performs IFFT, and transfers the IFFT data to a digital analog converter (DAC) 500.

The DAC 500 receives the IFFT data from the IFFT unit 490, transforms digital IFFT data to analog signal, and transfers the analog signal to the radio frequency (RF) unit 510.

The RF transmitter 510 receives the analog signal from the DAC unit 500, performs a RF modulation function, transforms the RF modulated signal to WiMedia UWB signal that provides a transmit rate of about 53.3 to 480 Mbps at about 3.1 to 10.6 GHz, and transfers the WiMedia UWB signal to the UWB antenna The RF receiver 520 receives the WiMedia UWB signal that provides a transmit rate of about 53.3 to 480 Mbps at about 3.1 to 10.6 GHz from the UWB antenna 170, demodulates it to baseband analog signal, and transfers the analog signal to an analog digital converter (ADC) 530.

The ADC 530 receives the analog signal from the RF receiver 520, transforms the analog signal to a digital signal, and transfers the digital signal to a fast fourier transform (FFT) unit 540. Also, the ADC 530 transforms a receive signal strength indicator (RRSI) data to a control signal of the UWB physical layer processor 400 to the controller 180.

The FFT 540 receives the digital signal from the ADC 530, performs the FFT, and transfers the FFT data to a parallel/serial converter 550.

The parallel/serial converter 550 receives the FFT data from the FFT unit 540, converts the parallel data to serial data, and transfers the serial data to an equalizer 560.

The equalizer 560 receives the serial data from the parallel/serial converter 550, performs an equalizing function to compensate signal distortion due to the transmission channel, and transfers the equalizer data to the demodulator 570.

The demodulator 570 receives the equalized data from the equalizer 560, performs a QPSK demodulation scheme if a transmit rate is about 53.3 to 200 Mbps, or performs a DCM demodulation scheme if a transmit rate is 320 to 480 Mbps. The demodulator 570 transfers the demodulated data to the de-interleaver 580.

The de-interleaver 580 collects the demodulated data from the demodulator 570, performs a bit de-interleaving function to correct the burst error, and transfers the de-interleaved data to the depuncturer 590.

The depuncturer 590 receives de-interleaved data from the de-interleaver 580, performs the de-puncturing function to regularly recover a predetermined portion of data cancelled through puncturing, and transfers the de-punctured data to the viterbi decoder 600.

The viterbi decoder 600 receives the de-punctured data from the depuncturer 590, performs viterbi decoding to correct an error, and transfers the viterbi decoded data to a RS decoder 610.

The RS decoder 610 receives the viterbi decoded data from the viterbi decoder 600, performs a RS decoding function to correct the burst error, and transfers the RS decoded data to a descrambler 620.

The descrambler 620 receives the RS decoded data from the RS decoder 610, generates original data from random code sequence generated from the scrambler, transforms the descrambled data to wireless USB host MAC data in a form of wireless USB host MAC data frame shown in FIG. 6, and transfers the wireless USB host MAC data to the wireless USB host medium access controller 300.

FIG. 5 is a diagram illustrating a wireless LAN station MAC data format generated by the wireless LAN physical layer processor 120 shown in FIG. 2.

Referring to FIG. 5, the wireless LAN station MAC data 700 is generated by the wireless LAN physical layer processor 120 of FIG. 2, and has a wireless LAN station MAC data frame.

The wireless LAN station MAC data 700 includes a wireless LAN MAC header, a wireless LAN link data, and a wireless LAN MAC trailer.

FIG. 6 is a diagram illustrating a wireless USB host MAC data format transformed by the wireless USB host medium access controller 300 of FIG. 2.

Referring to FIG. 6, a wireless USB host MAC data 800 is transformed from wireless USB link data received from the frame buffer 140 by the wireless USB host medium access controller 300 shown in FIG. 2.

The shown wireless USB host MAC data 800 includes a wireless USB MAC header, a wireless USB link data, and a wireless USB MAC trailer.

Figure 7:
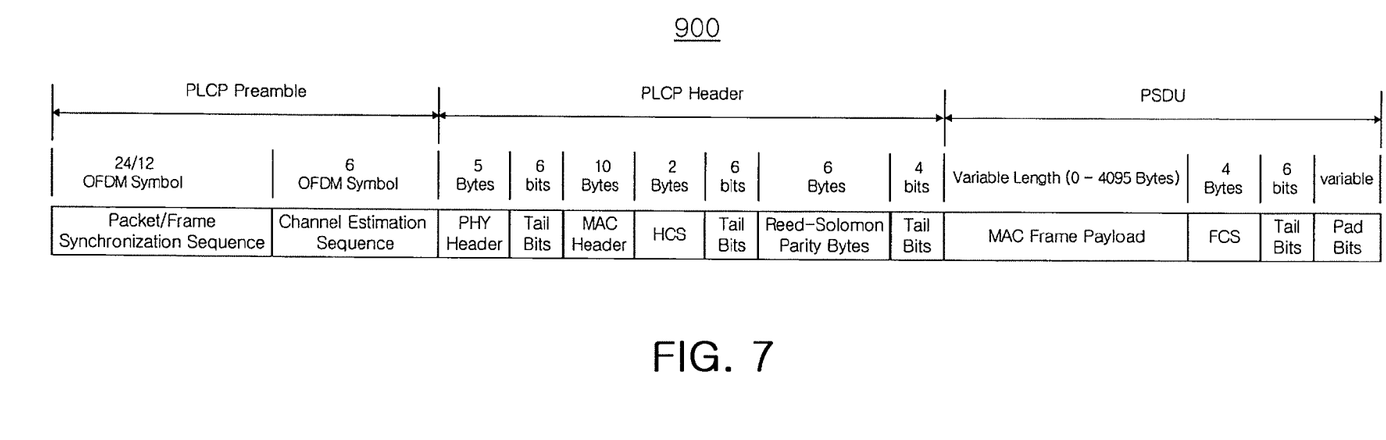
FIG. 7 is a diagram illustrating a PLCP processor data format transformed by the PLCP processor 410 shown in FIG. 4.

FIG. 7 is a diagram illustrating a PLCP processor data format transformed by the PLCP processor 410 shown in FIG. 4.

Referring to FIG. 7, the PLCP processor 410 transforms wireless USB host MAC data to the PLCP processor data in a format of WiMedia UWB PHY PPDU (PHY Protocol Data Unit).

The shown PLCP processor data includes a PLCP preamble, a PLCP header, and a presentation service data unit (PSDU).

As described above, the wireless LAN/USB bridge apparatus and method according to the certain embodiments of the present invention can connect a wired LAN and a wireless USB network by providing a function of connecting a wireless local area network (WLAN) access point (AP) and universal service bus (USB) apparatus to communicate with each others, providing a wireless LAN station function and a wireless UST host function, providing a function of converting wireless LAN signals to a ultra wide band (UWB) of 'WiMedia' to guarantee Quality of service (QoS), and providing a function of converting the 'WiMedia' UWB signal to a wireless LAN signal.

The wireless LAN/USB bridge apparatus according to the certain embodiment of the present invention provides mobility and fast wireless USB transmit rate, for example, about 53.5 to 480 Mbps, transmitting real-time audio/video data in real time with Quality of Service (QoS) guaranteed using 'WiMedia' UWB medium access control (MAC), and provides a wireless LAN station function and a wireless USB host function.

While the present invention has been shown and described in connection with the preferred embodiments, it will be apparent to those skilled in the art that modifications and variations can be made without departing from the spirit and scope of the invention as defined by the appended claims.

What is claimed is:

1. A LAN (local area network)/USB (universal serial bus) bridge apparatus comprising:
   a wireless LAN/USB signal processor for receiving a wireless LAN signal transmitted from a wireless LAN access point performing a bridging function between a wired LAN and a wireless LAN, transforming the received wireless LAN signal into a UWB (ultra wide band) signal, transmitting the UWB signal to at least one of wireless USB apparatuses, and for receiving the UWB signal transmitted from the wireless USB apparatuses, inverse-transforming the received UWB signal to the wireless LAN signal, and transmitting the wireless LAN signal to the wireless LAN access point; and
   a controller for controlling and managing operations of the LAN/USB signal processor.

2. The LAN/USB bridge apparatus according to claim 1, wherein the wireless LAN/USB signal processor comprises:
   a wireless LAN signal processor for transforming a wireless LAN signal received from the wireless LAN access point to a wireless LAN link data;
   a frame buffer for receiving the wireless LAN link data from the wireless LAN signal processor, temporally storing the wireless LAN link data, transforming the stored wireless LAN link data to wireless USB link data, and for receiving the wireless USB link data, temporally storing the wireless USB link data, inverse-transforming the wireless USB link data to the wireless LAN link data, and outputting the wireless LAN link data to the wireless LAN signal processor; and
   a wireless UWB signal processor for transforming wireless USB link data outputted the frame buffer to a wireless UWB signal, transmitting the wireless UWB signal to the wireless USB apparatus, and for transforming the wireless UWB signal transmitted from the wireless USB apparatuses to the wireless USB link data, and outputting the wireless USB link data to the frame buffer.

3. The LAN/USB bridge apparatus according to claim 2, wherein the wireless LAN signal processor comprises:
   a wireless LAN antenna for transmitting and receiving the wireless LAN signal to/from the wireless LAN access point;
   a wireless LAN physical layer processor for transforming a wireless LAN signal received at the wireless LAN antenna to wireless LAN station MAC (medium access control) data, outputting the wireless LAN station MAC data, transforming the wireless LAN station MAC data to the wireless LAN signal, and outputting the wireless LAN signal to the wireless LAN antenna; and
   a wireless LAN station medium access controller for transforming wireless LAN station MAC data outputted from the wireless LAN physical layer processor to the wireless LAN link data, and outputting the wireless LAN link data to the frame buffer.

4. The LAN/USB bridge apparatus according to claim 3, wherein the wireless LAN station MAC data has a wireless LAN station MAC data frame.

5. The LAN/USB bridge apparatus according to claim 4, wherein the wireless LAN station MAC data includes a wireless LAN MAC header, wireless LAN link data, and wireless LAN MAC trailer.

6. The LAN/USB bridge apparatus according to claim 2, wherein the wireless UWB signal processor comprises:
   a wireless USB host medium access controller for transforming the wireless USB link data outputted from the frame buffer to wireless USB host MAC data, outputting the wireless USB host MAC data, transforming inputted wireless USB host MAC data to the wireless USB link data, and outputting the wireless USB link data to the frame buffer;
   a UWB physical layer processor for transforming the outputted wireless USB host MAC data to the wireless UWB signal, outputting the wireless UWB signal, transforming inputted wireless UWB signal to the wireless USB host MAC data, and outputting the wireless USB host MAC data to the wireless USB host medium access controller; and
   a UWB antenna for transmitting a wireless UWB signal outputted from the UWB physical layer processor to the wireless USB apparatus, receiving a wireless UWB signal from the wireless USB apparatus, and outputting the wireless UWB signal to the UWB physical layer processor.

7. The LAN/USB bridge apparatus according to claim 6, wherein the wireless USB host medium access controller comprises:
   a transmitting/receiving memory for receiving wireless USB link transmission data from the frame buffer, receiving a control signal from the controller, temporally storing the received wireless USB link data, transforming the wireless USB link data to transmission memory data, and outputting the transmission memory data, and for receiving input receiving memory data, temporally storing the receiving memory data, transforming the receiving memory data to the wireless USB link receiving data, outputting the wireless USB link receiving data to the frame buffer, and outputting a control signal included in the receiving memory data to the frame buffer;

a transmitting/receiving queue for receiving transmission memory data from the transmission memory, temporally storing the received transmission memory data, and transforming the stored transmission memory data to transmission queue data based on a transmission queue control signal, and for receiving input receiving queue data, temporally storing the received receiving queue data, transforming the receiving queue data to the receiving memory data based on a receiving queue control signal, and outputting the receiving memory data to the transmitting/receiving memory;

a protocol controller for receiving transmission queue data from the transmitting/receiving queue, receiving a control signal from the controller, transforming the received transmission queue data to protocol control transmission data, outputting the protocol control transmission data, transforming inputted protocol control receiving data to the receiving queue data, and outputting the receiving queue data to the transmitting/receiving queue; and a medium access control transmitting/receiving unit for receiving protocol control transmission data from the protocol controller, transforming the protocol control transmission data to the wireless USB host MAC data, outputting the wireless USB host MAC data to the UWB physical layer processor, transforming wireless USB host MAC data received from the UWB physical layer processor to the protocol control receiving data, and outputting the protocol control receiving data to the protocol controller.

8. The LAN/USB bridge apparatus according to claim 6, wherein the UWB physical layer processor comprises:

a UWB physical layer transmission processor for transforming wireless USB host MAC data outputted from the wireless USB host medium access controller to the wireless UWB signal based on a control signal inputted from the controller, and outputting the wireless UWB signal to the UWB antenna; and a UWB physical layer receiving processor for extracting a control signal required for operation of the UWB physical layer transmission processor from a wireless UWB signal inputted from the UWB antenna, outputting the extracted control signal to the wireless USB host medium access controller, transforming the wireless UWB signal to the wireless USB host MAC data, and outputting the wireless USB host MAC data to the wireless USB host medium access controller.

9. The LAN/USB bridge apparatus according to claim 8, wherein the USB physical layer transmission processor comprises:

a PLCP(Physical Layer Convergence Procedure) processor for transforming wireless USB host MAC data received from the wireless USB host medium access controller to PLCP(Physical Layer Convergence Procedure) processed data;

a scrambler for transforming the PLCP processed data to scrambled data;

a RS (Reed Solomon) encoder for transforming the scrambled data to RS encoded data;

a convolutional encoder for transforming the RS encoded data to convolutional encoded data;

a puncturer for transforming the convolutional encoded data to punctured data;

an interleaver for transforming the punctured data to interleaved data by rearranging an order of symbol sequence and data sequence in a predetermined unit;

a modulator for modulating the interleaved data through one of QPSK(Quadrature Phase Shift Keying) modulation scheme and DCM(Dual Carrier Modulation) modulation scheme;

a serial/parallel converter for converting the modulated serial data to parallel data;

an IFFT(Inverse Fast Fourier Transform) unit for performing IFFT (Inverse Fast Fourier Transform) on the parallel data;

a DAC (digital to analog converter) for transforming the digital IFFT-transformed data to analog signal; and a RF transmitter for transforming the analog signal to a 'WiMedia' UWB signal, and outputting the 'WiMedia' UWB signal to a UWB antenna.

10. The LAN/USB bridge apparatus according to claim 9, wherein the UWB physical layer receiving processor includes:

a RF receiver for RF-modulating a wireless UWB signal received from the UWB antenna to a baseband analog signal;

an ADC (analog digital converter) for transforming the RF modulated UWB analog signal to digital data;

a FFT unit for transforming the digital signal to FFT data through FFT(Fast Fourier Transform);

a parallel/serial converter for transforming the FFT data to serial data through parallel-to-serial conversion;

an equalizer for transforming the serial data to equalized data by performing an equalizing function that compensates signal distortion according to a transmission channel;

a demodulator for demodulating the equalized data through one of QPSK demodulation scheme or DCM demodulation scheme;

a de-interleaver for performing a bit de-interleaving function on the demodulated data to correct burst error of the demodulated data;

a de-puncturer for recovering a predetermined portion of regularly cancelled data by performing a de-puncturing function on the de-interleaved data;

a viterbi decoder for performing a viterbi decoding function on the de-punctured data to correct random error;

a RS decoder for performing a RS decoding function on the viterbi-decoded data to correct burst error; and a descrambler for transforming the RS decoded data to the wireless USB host MAC data by performing a descrambling function generating original data from random code sequence generated by the scrambler.

11. The LAN/USB bridge apparatus according to claim 9, wherein the PLCP processor data has WiMedia UWB PHY PPDU(PHY Protocol Data Unit) frame format.

12. The LAN/USB bridge apparatus according to claim 11, wherein the PLCP processor data includes a PLCP preamble, a PLCP header, and a PSDU(presentation service data unit).

13. The LAN/USB bridge apparatus according to claim 6, wherein the wireless USB host MAC data has a wireless USB host MAC data frame format.

14. The LAN/USB bridge apparatus according to claim 1, wherein the ADC transforms RSSI (receive signal strength indicator) for the digital data to a control signal of the UWB physical layer processor, and outputs the control signal to the controller.

15. The LAN/USB bridge apparatus according to claim 1, wherein the modulator performs the QPSK modulation scheme at a transmit rate of about 53.3 to 200 Mbps or performs the DCM modulation scheme at a transmit rate of about 320 to 480 Mbps.

16. The LAN/USB bridge apparatus according to claim 1, wherein the wireless UWB signal has a transmit rate of about 53.3 to 480 Mbps at about 3.1 GHz to 10.6 GHz.

17. The LAN/USB bridge apparatus according to claim 1, wherein the wireless USB host MAC data includes a wireless USB MAC header, a wireless USB link data, and a wireless USB MAC trailer.

* * * * *